3,173,755
SYNTHESIS OF CALCIUM CYANAMIDE
Jean P. Picard and Marcel Blais, Morristown, N.J., assignors to the United States of America as represented by the Secretary of the Army
No Drawing. Filed Sept. 26, 1962, Ser. No. 227,117
2 Claims. (Cl. 23—78)
(Granted under Title 35, U.S. Code (1952), sec. 266)

The invention described herein may be manufactured and used by or for the Government for governmental purposes without payment to us of any royalty thereon.

This invention relates to a novel process for the preparation of calcium cyanamide without the use of electrical power. More particularly, this invention relates to a simple and efficient process for the production of calcium cyanamide by the reaction of ammonia with carbon dioxide, using calcium oxide as the carrier.

Calcium cyanamide produced by the present process is sufficiently pure that it may be used in the manufacture of nitroguanidine by either the Welland or the British Aqueous Fusion Process. Both of these processes are electro-chemical syntheses. The electrical energy required to prepared the calcium cyanamide used in both processes is approximately 80% of the total energy required for the nitroguanidine manufacture.

In an attempt to reduce or eliminate the quantity of electricity required, prior investigators tried passing ammonia gas mixed with a small quantity of carbon dioxide (about 12%) over calcium carbonate which had been heated to 750–800° C., and obtained calcium cyanamide which was about 90% pure.

One of the drawbacks of this prior art method was the high loss of ammonia through cracking at the required reaction temperature of 750° C. unless special precautions were taken to avoid metallic particles. In addition, the water evolved from the reaction at that temperature tended to hydrolyze the calcium cyanamide to urea and calcium carbonate. Attempts to scale up this process met with difficulties, such as finding a suitable material for the construction of the furnace, and the general problem of heat transfer through the reacting mass.

Another non-electrical process which has received attention is a 20 lb./hr. pilot plant in which calcium cyanamide is produced by passing carbon monoxide and ammonia over lime heated to 700° C. The purity of the product produced is about 55% and the average overall yield is 76%, based on the ammonia used.

Cyanates, cyanurates, or carbamates are capable of yielding cyanamide by elimination of carbon dioxide or carbon dioxide and water. Metal cyanamides can be produced by heating various alkali salts of cyanates and cyanurates at 700° C. for relatively short periods of time (1 hour). Sodium, potassium, and barium were employed with varying success. Magnesium, zinc, and cadmium were also employed. The primary drawback of using these metal salts was a matter of economics. For large scale production of cyanamides, these metal salts of cyanates or cyanurates as a starting material were either too expensive or the yield of cyanamide was very poor.

Since either calcium cyanate or calcium cyanurate gives the corresponding cyanamide on heating, methods for their preparation were sought. Heating lime and urea in the neighborhood of 300–350° C. resulted in a mixture of calcium cyanate and cyanurate.

The difficulties remaining to be overcome were the large volume of gases which had to be circulated through the hot bed in order to produce even a limited quantity of cyanamide, the cracking of ammonia, and the rather low purity of the product.

The primary object of this invention is to develop an alternative preparation of graphite-free calcium cyanamide which does not involve the use of electrical power.

Another object of this invention is to develop a process for the production of calcium cyanamide which does not involve ammonia gas at elevated temperatures.

Other objects will become apparent from the following disclosure.

Although little is known about the mechanism of the reaction, it was found that the overall yield of calcium cyanamide, based on urea, was approximately constant, and independent of the quantity of urea used. It was also found that the purity of the product increased as the molar ratio of urea to lime was increased. When a 1:3 lime to urea ratio was used, it was found to be the optimum ratio and the purity of the product was 97%. It appears that, when heated, urea first yields cyanic acid which then reacts with lime to form calcium cyanurate. The calcium cyanurate then decomposes on subsequent heating into calcium cyanate and cyanic acid. The mechanism is illustrated by the following equations:

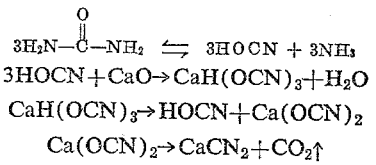

$$3HOCN + CaO \rightarrow CaH(OCN)_3 + H_2O$$
$$CaH(OCN)_3 \rightarrow HOCN + Ca(OCN)_2$$
$$Ca(OCN)_2 \rightarrow CaCN_2 + CO_2\uparrow$$

The cyanic acid can either be reacted with ammonia to form urea or can be hydrolyzed and recovered as ammonia and carbon dioxide, which can be recycled for reuse. A study of the material balance and the results of a run in which a molar ratio of 1:1 urea to lime converted only ⅓ of the lime to calcium cyanamide, tend to support the preceding postulated mechanism.

The procedure used to make calcium cyanamide from lime and urea is relatively simple. Irrespective of the ratios of urea to lime employed, the ingredients are thoroughly mixed together and placed in a closed kettle. The contents of the kettle are heated and slowly raised from 130° to 300° C. over a half hour period, and the contents are maintained at 300° C. for one hour. At 130° C. the reaction mixture is fluid, but as the reaction proceeds and ammonia is evolved, it turns to a solid mass. After the mass has cooled to room temperature, the solid residue is ground to a fine powder. This powder is a mixture of calcium cyanurate, calcium cyanate, and some unreacted calcium oxide, or calcium carbonate; the calcium carbonate will increase in quantity whenever the calcium oxide used is not dry. This mixture is introduced into a rotary kiln and heated to 700° C. for one hour. During the heating period a current of nitrogen is passed through the furnace to help remove carbon dioxide.

The economic success of the present method of preparing calcium cyanamide depends upon integration of the process with a urea plant so that all gases evolved during the reaction can be recirculated to the urea converter for reuse. This new method offers a definate economic advantage in that it produces graphite-free calcium cyanamide. Usually, the calcium carbonate produced in the manufacture of nitroguanidine is contaminated with graphite and cannot be reused. The use of graphite-free calcium cyanamide will permit the reuse of calcium carbonate, thus reducing the cost of the calcium cyanamide, and simplifying the waste disposal problem.

In the present process, the water of reaction will not interfere with the formation of calcium cyanamide, and the amount of ammonia lost through cracking will be negligible since the ammonia will at no time be heated to 700° C. Recycling of the ammonia and carbon dioxide evolved to form urea involves no problem, and further recycling of the calcium carbonate from the nitroguanidine manufacture back to calcium cyanamide is equally as simple. This means that for the first time, nitroguanidine can be made from ammonia and carbon dioxide by a series of closed cycle reactions using calcium oxide as a carrier.

The preparation of calcium cyanamide from line and urea represents no new departure from present industrial pyrolysis operations. The equipment and techniques now used in the manufacture of calcium oxide from calcium carbonate are directly applicable to this process. The equipment required for preparation of calcium cyanate is simple since no corrosion problems exist.

We claim:

1. A method of making graphite free calcium cyanamide which comprises reacting urea and calcium oxide in a molar ratio of about 3:1 in a closed kettle at about 300° C. until a solid is formed and ammonia is given off, crushing the solid and reheating in a kiln to about 700° C. to form calcium cyanamide and carbon dioxide.

2. A method in accordance with claim 1 wherein the ammonia and carbon dioxide are recycled to form urea which is returned to the process.

References Cited by the Examiner
UNITED STATES PATENTS

| | | | |
|---|---|---|---|
| 2,086,171 | 7/37 | Neubner | 23—78 X |
| 2,632,678 | 3/53 | Walter | 23—78 |
| 2,797,979 | 7/57 | Daniels et al. | 23—78 |
| 3,039,848 | 6/62 | Schaus | 23—78 |

OTHER REFERENCES

Smith's College Chemistry, D. Appleton-Century Co., Inc. (1946), page 349.

MAURICE A. BRINDISI, *Primary Examiner.*

CARL D. QUARFORTH, *Examiner.*